United States Patent [19]

Klein

[11] Patent Number: 5,429,333

[45] Date of Patent: Jul. 4, 1995

[54] APPARATUS AND METHOD FOR TEMPORARY ATTACHMENT OF HOLDING OR FASTENING MEANS TO A SURFACE

[75] Inventor: Wilhelm Klein, Elchingen, Germany

[73] Assignee: Wilhelm Klein GmbH, Elchingen, Germany

[21] Appl. No.: 30,400

[22] PCT Filed: May 21, 1992

[86] PCT No.: PCT/DE92/00425

§ 371 Date: Mar. 23, 1993

§ 102(e) Date: Mar. 23, 1993

[87] PCT Pub. No.: WO93/03286

PCT Pub. Date: Feb. 18, 1993

[30] Foreign Application Priority Data

Aug. 5, 1991 [DE] Germany .............. 41 25 889.4

[51] Int. Cl.6 .................................. A45D 42/14
[52] U.S. Cl. ......................... 248/205.9; 248/205.7
[58] Field of Search ............... 248/205.5, 205.9, 205.8, 248/205.7, 205.6

[56] References Cited

U.S. PATENT DOCUMENTS

| 2,749,097 | 6/1956 | Billner | 248/205.9 X |
| 3,028,131 | 4/1962 | Beck et al. | 248/205.9 X |
| 4,012,007 | 3/1977 | Cunningham | 248/205.8 X |
| 4,356,989 | 11/1982 | Ireland | |
| 5,014,946 | 5/1991 | Gruber | 248/205.9 X |

FOREIGN PATENT DOCUMENTS

| 1595727 | 7/1970 | France . | |
| 2262751 | 9/1975 | France | 248/205.9 |
| 815752 | 7/1959 | Germany . | |
| 2001169 | 7/1971 | Germany . | |
| 2723616 | 12/1978 | Germany . | |
| 2744463 | 4/1979 | Germany . | |
| 3425853 | 5/1985 | Germany . | |
| 3501753 | 7/1986 | Germany . | |

Primary Examiner—Ramon O. Ramirez
Assistant Examiner—Korie Chan
Attorney, Agent, or Firm—Herbert Dubno

[57] ABSTRACT

A device for temporary attaching holding or fastening structure to a surface. The device includes a fixture traversed by vacuum passages, whose one side bears the holding or fastening structure and whose other side serves sealing purposes and is provided with a closed roll of compressible material.

17 Claims, 9 Drawing Sheets

APPARATUS AND METHOD FOR TEMPORARY ATTACHMENT OF HOLDING OR FASTENING MEANS TO A SURFACE

CROSS REFERENCE TO RELATED APPLICATIONS

This is a national phase application corresponding to PCT/DE 92/00425 filed May 21, 1992 and based in turn upon the German application P 41 25 889.4 filed Aug. 5, 1991 under the International Convention.

The invention relates to a device as well as a method for temporary attachment of holding or fastening means to a surface having irregularities, whereby the vacuum principle used in suction attachments is applied.

BACKGROUND OF THE INVENTION

There are known devices having a suction attachment connected to a vacuum pump and which is applied to workpiece in order to be used as load hook. Further known are suction attachments in connection with drilling devices, whereby these suction attachments serve as equipment holders (DE 35 01 753, DOS 27 44 463). From French Patent 1 595 727 a suction cup with a compressible pad made of porous rubber is known.

Finally, vacuum holding devices are known which work with plate-shaped or cup-shaped suction elements, which on the side facing away from the workpiece to be held are provided with sealing lips or a sealing ring, whereby the latter is made of a very soft, elastically deformable material and is designed as special, separate part and connected with the suction element (DE-AS 27 23 16).

The task of these known devices is to hold or to transport loads, such as drilling equipment. A precondition for the acceptable operation of these devices is a basically even, smooth, dense and homogeneous surface of the load to be transported. The suction elements known from DE-AS 27 23 616 and French Patent 1 595 727 can also be used on a substrate which is not completely even, but provided a predetermined negative pressure is constantly maintained.

OBJECTS OF THE INVENTION

It is the object of the invention to provide a device based on the vacuum principle for the temporary attachment of holding or fastening means which can be affixed to a surface having irregularities and/or which is inclined;

Still another object is to provide such device that continues to have sufficient holding power after the negative pressure has been reduced or eliminated; and Yet another object is to provide a method for mounting the device according to the invention.

SUMMARY OF THE INVENTION

Such tasks have to be frequently performed not only in industry, trades, but also in private life. For instance, in construction it is a matter of creating support for a concrete encasing, of fastening scaffolding, of affixing a mounting on an inclined roof surface or simply of securing a freely set cable in several points at a corresponding height.

In order to solve this problem, the invention stems out from such a known device as described in French Patent 15 95 727. The device consists of a mounting plate traversed by vacuum passages and bearing on one side the holding or fastening element, and of other side of the plate which serves sealing purposes and is provided with a closed roll of compressible material.

According to the invention, the mounting plate is designed as a plane-parallel and stiff holding plate, on whose sealing side a roll is applied as a plastically deformable sealing mass.

Thereby it is advantageous to use a corrosion-resistant plastic material with surface adhesion for the holding plate, whereby polypropylene proves to be particularly suitable as a plastic material.

This holding plate can have one or more vacuum connections running in the plane of the plate or vertically to the plate plane. In the first instance they run as channels ending in suction openings. Several vacuum connections in such the plate offer the possibility to create several vacuum chambers by mounting several closed rolls of a plastically deformable sealing mass, therefore limiting the unsealed areas of the substrate.

In order to maintain a sufficient volume of vacuum when the holding plate is affixed to an uneven surface, it is advisable to insert one or more limiters in the sealing side of the holding plate as spacers with its length suitably adjustable. For this purpose it is possible to insert in the holding plate an inner thread consisting of metallic parts, which, for instance, would serve for receiving the spacers. Such inner threads can be provided also on the outside of the holding plate, for optional fastening of holding elements.

Furthermore the sealing side of the holding plate can be provided with a surface structure enhancing the adhesion forces. For instance this surface can be provided with milled ribs or simply be sandblasted.

Finally the holding plate can be provided with lateral grip ledges, which would facilitate its application onto and removal from a substrate. These grip ledges or optionally additional recesses can serve for the application of a corresponding tool for the removal of the holding plate.

As the plastically deformable sealing mass of the holding plate polyisobutylene is used, whose characteristics are ideal for the present purpose. This plastic material, for instance in the form of a roll, is placed around the rim of the holding plate and is easily pulled off the uneven surface as well as the holding plate, without leaving residues. This way this material can be used again repeatedly when such a holding plate is used. When vacuum is created between the holding plate and the surface, it has the particular feature of fitting itself vacuum tight to the irregularities of the latter. Besides, as a result of its excellent adhesion characteristics a surprising effect results in that even after the elimination of the vacuum existing between the holding plate and the uneven surface, the holding plate remains attached under load for a longer period of time, sometimes up to weeks. This holding or adhesive effect can even be permanent. This surprising effect represents an essential advantage over the previously mentioned known suction attachments, which work with sealing lips or sealing rings of rubber or a rubber-like material, as well as over the ones provided with a roll of compressible elastic material according to French Patent 15 95 727. In these known suction attachments, when the vacuum is eliminated, the object carried by the suction plate falls down instantly.

Nor is the invention obviated by DE-OS 34 25 853 which teaches how to produce mountings or hooks on an even wall by generating a vacuum between the mountings and wall and by subsequently injecting sealing masses. This known mounting can carry a load only after the sealing mass has hardened and therefore does not solve the problem of the invention.

The plastically deformable sealing mass can have its profile preshaped before it is attached to the holding plate. For producing a preshaped profile an extruder can be used. This profile can be shaped like sealing lips in order to achieve a quick sealing. The application of the extruded profile onto the holding plate is thereby facilitated by a guide element which is guided along in a groove of the holding plate.

It has already been mentioned that the sealing mass can be applied as a closed rim in the desired shape. This shape can be selected so that unsealed areas of the substrate can be excluded. The amount and cross section of the sealing mass can be adjusted to the respective purpose of use, in order to achieve the respective desired adhesion force.

Depending on circumstances the sealing mass can be selected from so-called polar masses (used between −30° to +5° C.), standard masses (used at 0° to +40° C.) and tropical masses (used between +15° to +70° C.). A combination of these masses are also possible. With the assistance of pressure or suction, the introduction of liquids or gases of various temperatures is advantageous for easy assembly and disassembly.

An essential advantage resulting from the use of a plastically deformable sealing mass consists also in the fact that it is self-sticking and can be affixed onto an uneven surface even before generating vacuum—by mechanical contact pressure—since indentations occur between the sealing mass and the uneven surface.

The use of plastically deformable sealing masses offers such a further advantage as the vacuum sealing of the holding plate can be fixed at any time with additional sealing masses, if there are still unsealed spots. The use of thinned glue or paste can make advantageous substrates airtight, without thereby noticeably changing the substrate.

In order to enhance safety and for an easier supervision of the device of the invention it is proposed to provide an optic or acoustic alarm triggered by the failure of the vacuum generator, i.e. due to current interruption or when the vacuum decreases due to other reasons.

A further improvement of the device of the invention consists in the fact that an additional vacuum tank with a sufficient vacuum chamber is provided, which is interposed between the required vacuum pump and the vacuum duct traversing the holding plate. This vacuum tank, which has a cylindrical shape and is provided with one or more perforated intermediate walls or with external peripheral ribs for reinforcement, maintains the vacuum over a longer period of time, even after the vacuum pump was turned off. This vacuum tank is supposed to be equipped with a fluid meter as well as with a discharge valve for the aspired fluid.

BRIEF DESCRIPTION OF THE DRAWING

The above and other objects, features, and advantages will become more readily apparent from the following description, reference being made to the accompanying drawing in which:

FIG. 2b is a frontal view of the plate seen in FIG. 2a;

FIG. 5 is a top view of the vacuum tank shown in FIG. 4a;

SPECIFIC DESCRIPTION

Figure 1:
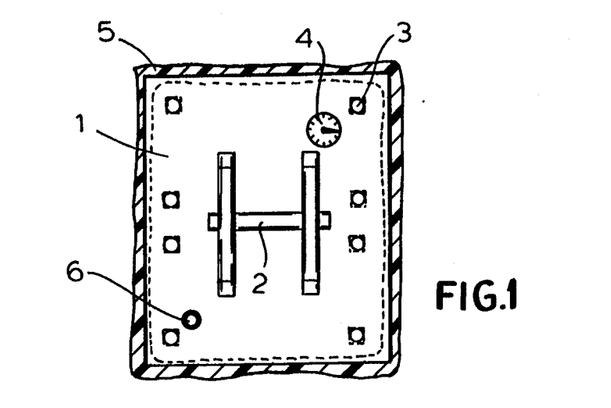
FIG. 1 is a top sectional view of a holding plate according to the invention.
Figure 2:
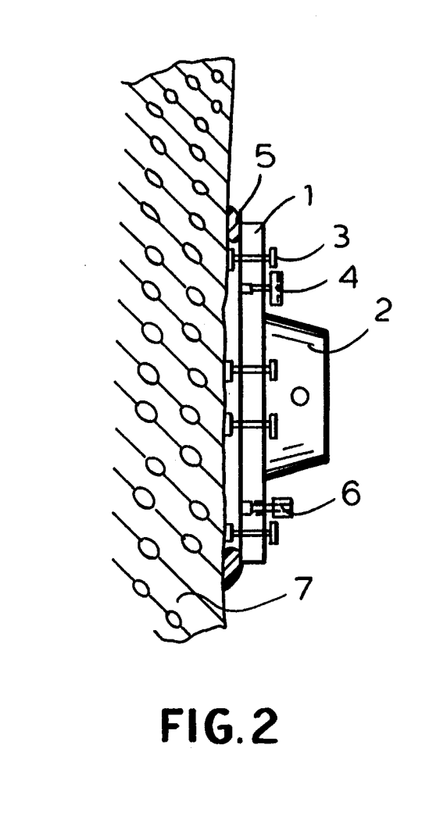
FIG. 2 is a lateral view of the holding plate assembled on the wall.

The basic principle of the invention results for instance from the illustrations according to FIG. 1 and 2. These figures show the holding plate 1 which is made of a light-weight plastic material which does not distort, shrink, corrode or absorb humidity. This holding plate 1 of plastic material is pressed against the substrate 7 having an uneven surface by providing an intermediate plastic sealing mass 5 which has been previously applied to the backside of holding plate 1 along its edges. In order to maintain a predetermined volume of vacuum between the holding plate 1 and the substrate 7, through the holding plate 1 one or more longitudinally adjustable dividers 3 traverse the plate in a vacuum tight manner and rests against the substrate 7. Further the holding plate 1 has passages for a vacuum gauge 4 as well as for a vacuum hose connection 6. Further the holding or fastening means 2 can be seen on the outside of the holding plate 1.

This holding plate has a size of approximately 30×30 cm and a thickness of 3 to 5 cm.

If such a holding plate 1 is pressed against a wall with rough finish, all that has to be done is to establish and maintain a vacuum between the substrate 7 and the holding plate 1 through the vacuum connection 6, in order to be able to use the holding and fastening means 2 according to their purpose. With the aid of a vacuum pump a vacuum of approximately −0.7 or −0.8 bar is generated, which can be read on the vacuum gauge.

Figure 1A:
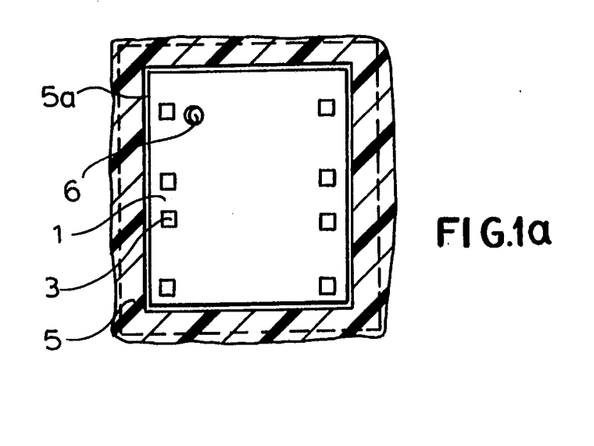
FIG. 1a is a rear sectional view of this holding plate.

FIG. 1a shows a rear view of the holding plate 1 represented in FIG. 1 with the plastic sealing mass 5 applied to its rim. Besides a bar 5a provided on this backside is shown, which facilitates the application of the plastic mass 5 on the rim area of holding plate 1.

Under certain circumstances, this bar 5a can make the divider 3 superfluous.

Figure 1B:
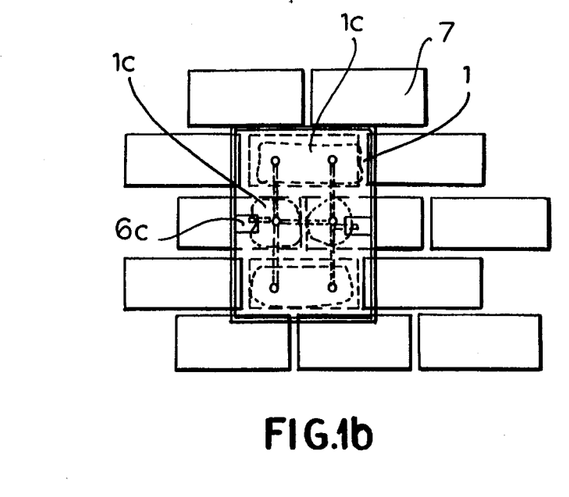
FIG. 1b is the holding plate affixed to a wall.

FIG. 1b shows the fastening of holding plate 1 to unplastered brickwork. Since the individual bricks consisting of an airtight material are separated from each other by air-permeable gaps, first several rolls 1c of a plastically deformable material are applied to the sealing face of holding plate 1, so that after the holding plate 1 is pressed against the brickwork 7 a corresponding number of vacuum chambers can be established. For this purpose suction openings connected with these vacuum chambers are connected with the laterally mounted vacuum connections 6a.

Figure 2A:
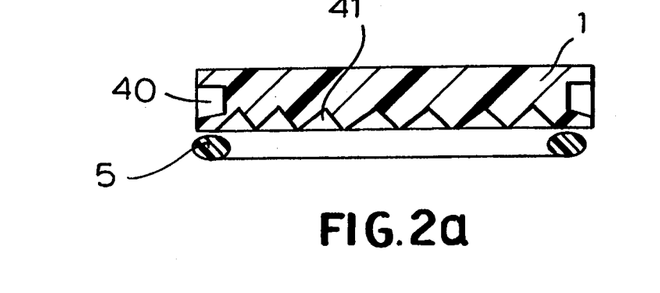
FIG. 2a is a cross sectional elevated view of another embodiment of the holding plate according to the invention.
Figure 2B:
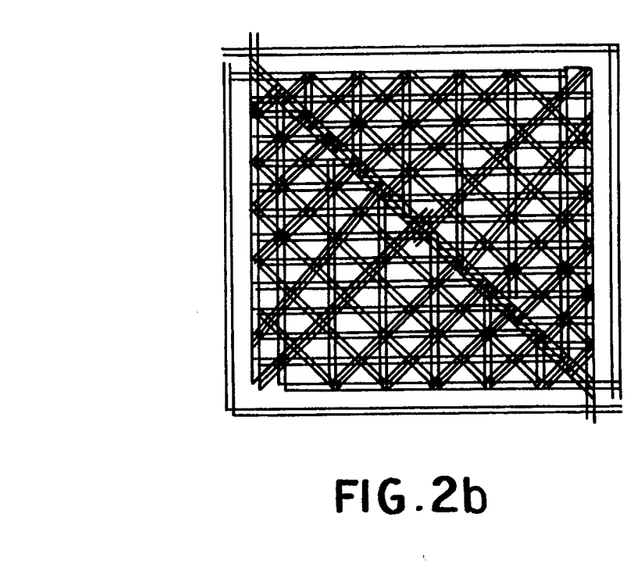

In FIGS. 2a and 2b a holding plate of different execution is shown in cross section and in a frontal view. Its sealing face is provided with a surface 41 which has been roughened by milling or sandblasting, this way contributing to the enhancement of the adhesion forces. Besides in the representation in cross section according to FIG. 2a a gripping bar 40 can be seen, which serve for an easier handling of the holding plate.

Figure 3:
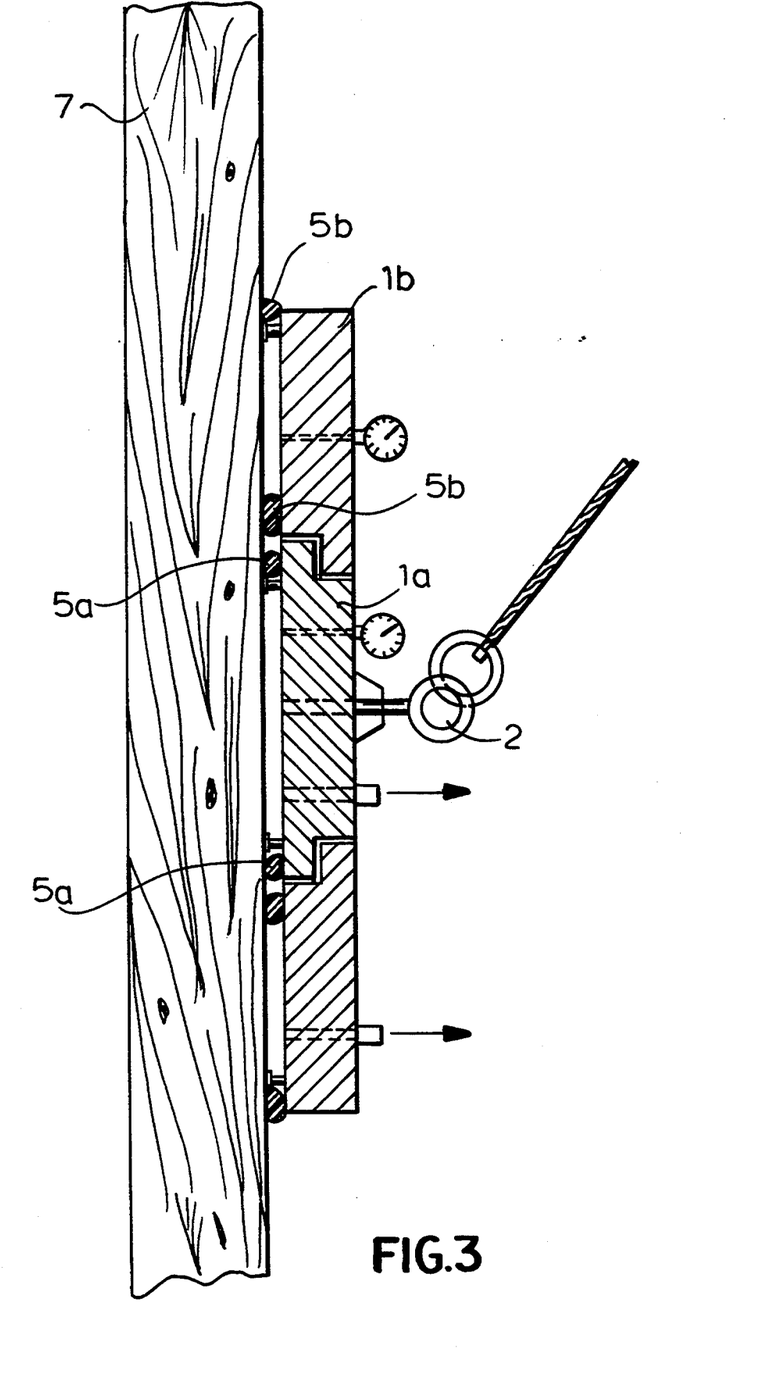
FIG. 3 is a sectional view of a further embodiment of the holding plate, assembled on the wall.

In FIG. 3 a further embodiment of the device of the invention corresponding to FIG. 2 is represented, which affords increased safety. In this case the holding plate consists of two interfitting plates 1a and 1b, which form separate vacuum chambers with the substrate or wall 7. The vacuum chamber between the holding plate 1a and the wall 7 is defined by the plastic sealing mass 5a, the vacuum chamber between the holding plate 1b and the wall 7 is defined by the plastic sealing mass 5b. Both vacuum chambers are connected to separate vacuum generators, so that for instance when the vacuum generator assigned to holding plate 1a fails, this holding plate 1a continues to be held by the holding plate 1b.

Figure 4:
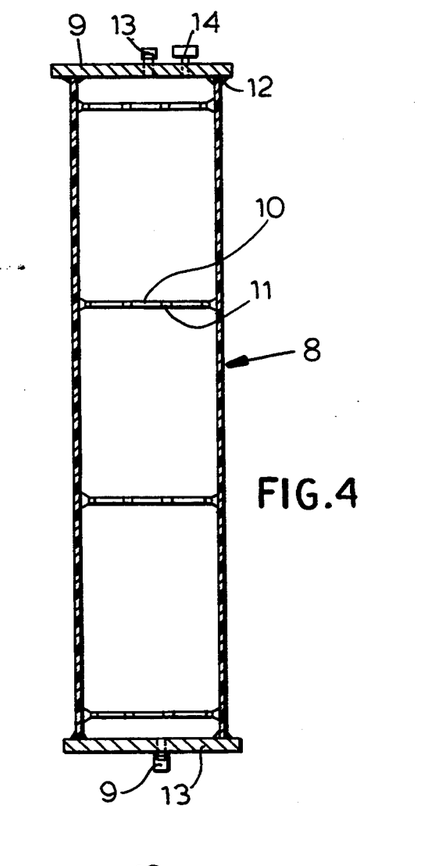
FIG. 4 is a longitudinal sectional view of an additional vacuum tank.
Figure 5:
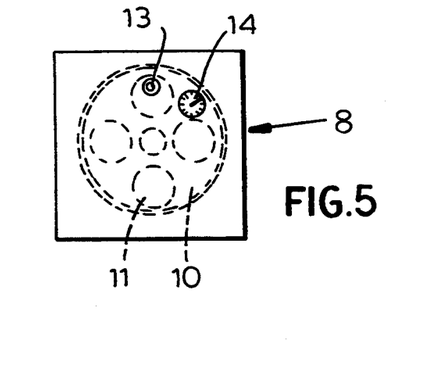

In FIGS. 4 and 5 an additional vacuum tank 8 is shown, whose vacuum chamber is connected in series via vacuum hoses with the vacuum generated by the devices shown in the preceding figures. This vacuum tank consists of a plastic tube which is closed in a vacuum tight manner on both ends by cover plates 9. These cover plates 9 are again sealed with the plastic sealing mass 12. In order to keep up its buckling resistance this plastic tube is provided with one or more perforated dividing walls 10, which are also kept in place by the plastic sealing mass. The sealing points are marked 12, the holes are marked 11. The cover plates 9 of this vacuum tank 8 have connections 13 for the vacuum line, further there is a vacuum gauge 14 in one of the cover plates.

Figure 4A:
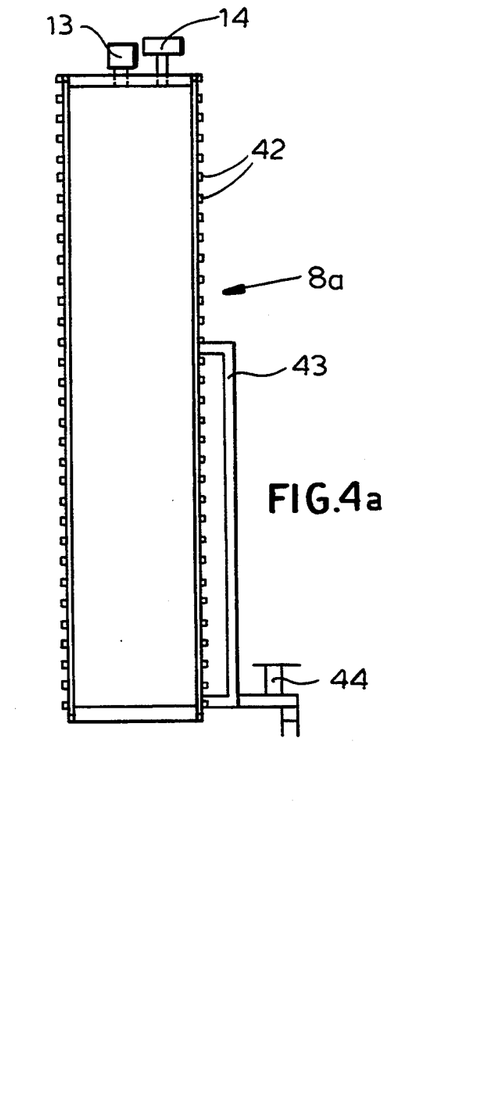
FIG. 4a is a longitudinal sectional view of an additional vacuum tank according to another embodiment of the present invention.

A modified embodiment of such a vacuum tank 8a is shown in FIG. 4a. In order to achieve sufficient buckling resistance, this tank 8a is provided with peripheral external ribs 42. In addition, this tank is provided with a display fixture 43 showing the level of aspired liquid, as well as with a liquid valve 44 for the evacuation of the aspired liquid. It would be suitable to provide these fixtures also in the embodiment of FIG. 4.

Depending on their purpose, such vacuum tanks as shown in FIGS. 4 and 4a can have a height of 50 cm to 5 m, a diameter of 10 cm to 50 cm and a wall thickness of 7 to 12 mm.

In FIGS. 6 to 12 embodiment examples for the use of the device of the invention are shown, whereby identical or corresponding parts are marked with the same reference numerals as in the preceding figures. In these shown examples only the mounting of the holding plate is partially shown, without the required implements for the vacuum generation or maintenance. As a rule there are always pertaining vacuum generators, a special supplementary vacuum tank, a vacuum switch and the required vacuum lines, which have not been illustrated for the sake of simplicity. Thereby the vacuum switch has the task to automatically turn on the vacuum generator (and also to turn it off again) when the vacuum surpasses a certain preselected value.

However, in this connection it has to be pointed out that for a temporary attachment of holding or fastening means to an uneven or inclined wall it is not absolutely necessary to include a vacuum generator in the circuit. It can be absolutely sufficient to connect the vacuum passages through the holding plate with a vacuum tank under vacuum, after the holding plate has been affixed to the uneven wall, as shown in FIGS. 4, 4a and 5. The vacuum contained in this tank is then sufficient for the evacuation of air contained in the space between holding plate and the wall with uneven surface, thereby strongly pressing the holding plate against the wall.

Figure 6:
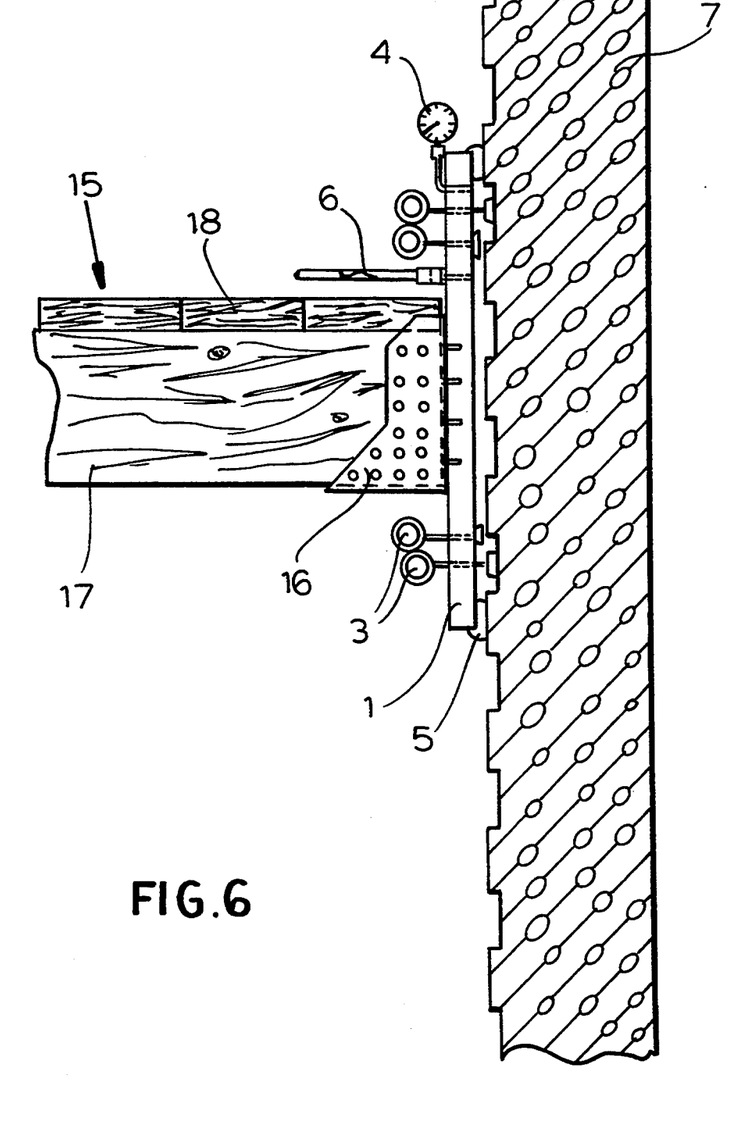
FIG. 6 is a diagrammatic view of the holding plate according to the invention mounted to hold a work platform.

Now in FIG. 6 one wall 7 is shown, which can be for instance a shaft wall, a staircase or a tank wall having an extraordinarily uneven surface. To this uneven surface a work platform 15 has to be affixed. This is takes place with the holding plate 1, which is first coated in the aforedescribed manner with the plastic sealing mass 5 and then pressed against the wall 7. Then over the vacuum connection 6 the vacuum is produced in the intermediate space. The holding means consist in this case of carrier plate 16 fitted onto the holding plate and wherein next the square timber 17 and thereon the deals 18 are positioned.

Figure 7:
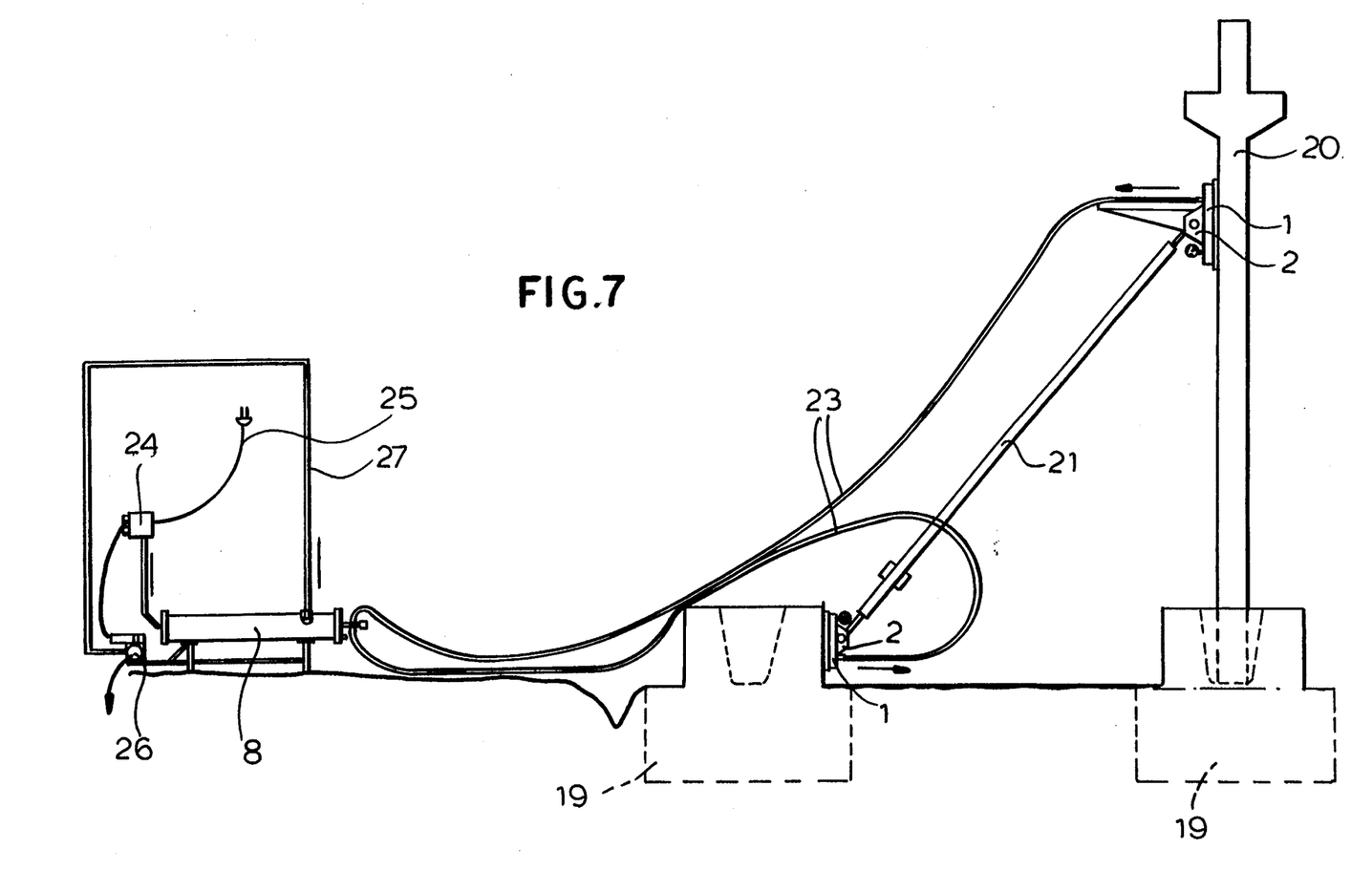
FIG. 7 is a diagrammatic view of the holding plate according to the invention along with the assembly of finished construction components.

In FIG. 7 it is shown how the invention can be applied in the assembly of finished parts, providing assistance for directional accuracy. In this case two holding plates 1 are used which are fastened on the one side to the foundation anchor block 19 and on the other side to the support 20 for the finished concrete component and which in turn are connected by a screw-adjustable support 21. The vacuum chambers underneath these two holding plates 1 are connected via vacuum hoses 23 to the vacuum tank 8, which in turn is connected via vacuum line 27 with the vacuum generator 26. The vacuum generator 26 is controlled by vacuum switch 24; the network connection is marked 25.

In this embodiment example all devices for vacuum generation and vacuum maintenance are used twice.

Figure 8:
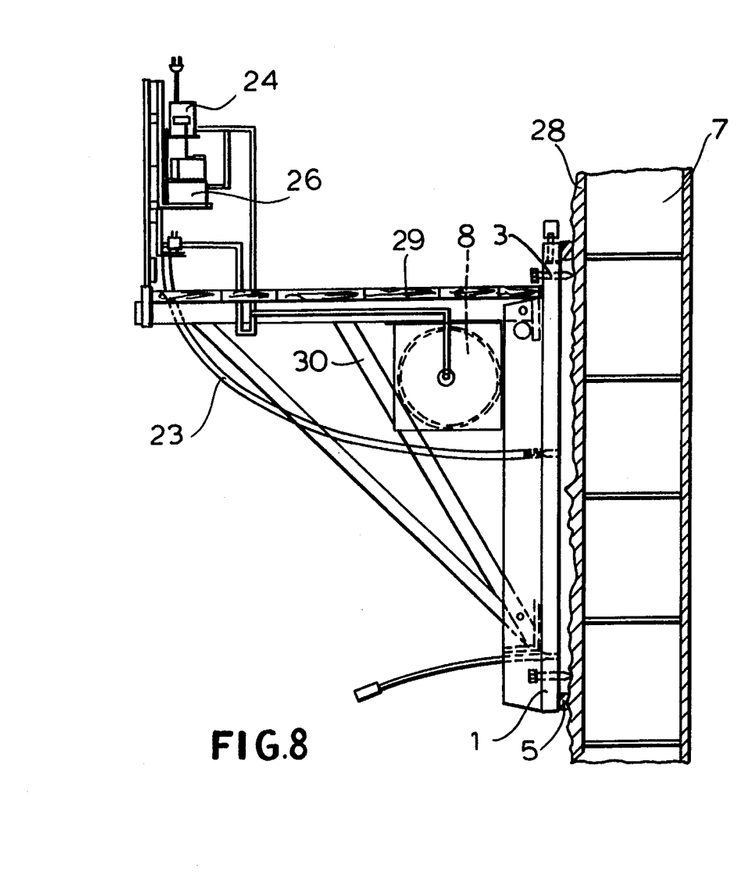
FIG. 8 and FIG. 9 are diagrammatic views of the holding plate according to the invention mounted to hold protection scaffolding.
Figure 9:
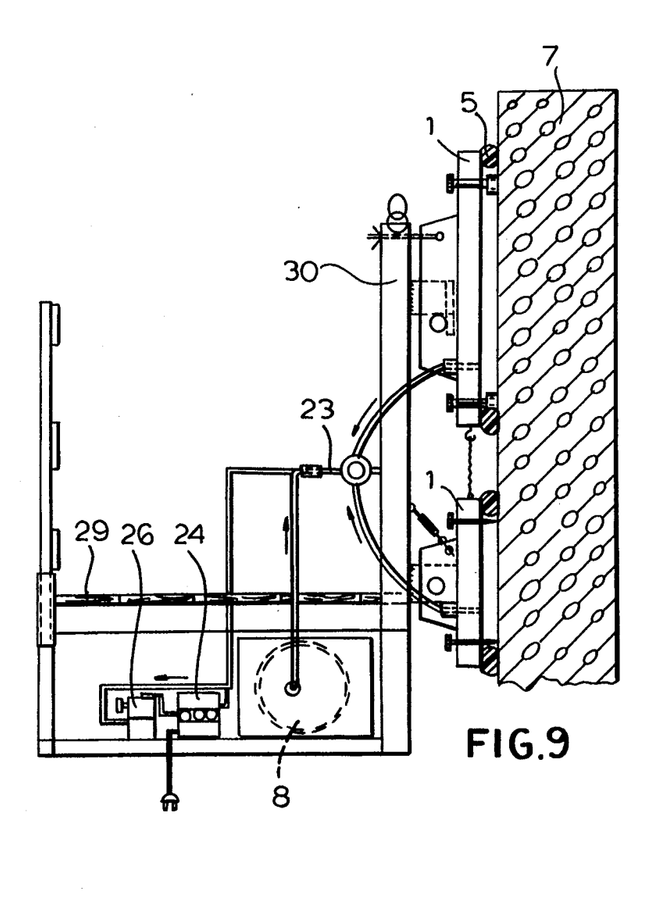

In FIGS. 8 and 9 two embodiment examples are explained, which also pertain to the field of construction. In FIG. 8 a brick wall is shown, which is covered by a rough finish 28. The holding plate 1 is set against this roughly finished wall, this plate being supposed to carry in turn the scaffolding console 30 with the work surface 29. In this example the holding plate 1 with the scaffolding console 30 and the work surface 29 form a unit, which at the same time carry the vacuum tank 8 as well as the vacuum generator 26 and the vacuum switch 24. Via vacuum line 23 the vacuum generator 26 is connected with the vacuum passages of the holding plate 1. This described unit can be transported as a whole and can be used as such at any desired construction site.

The construction shown in FIG. 9 is similar, it differs from the construction in FIG. 8 in that a total of two holding plates 1 are provided, which form a constructive unit with the scaffolding console 30 and the work surface 29, as well as with the other shown devices.

Figure 10:
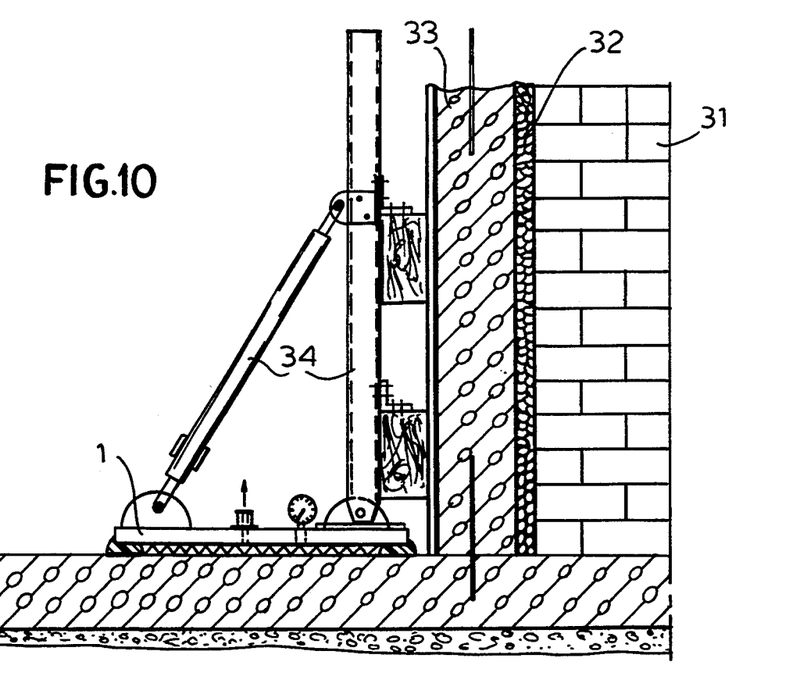
FIG. 10 is a diagrammatic view of the holding plate according to the invention and supporting framework for single-headed casings.

Finally FIG. 10 shows the fastening of the support framework 34 with the aid of the holding plate 1 of the invention. On an existing building 31 after an insulation 32 a concrete wall 33 has to be erected, and for this purpose it is necessary to install the support framework 34.

Figure 11:
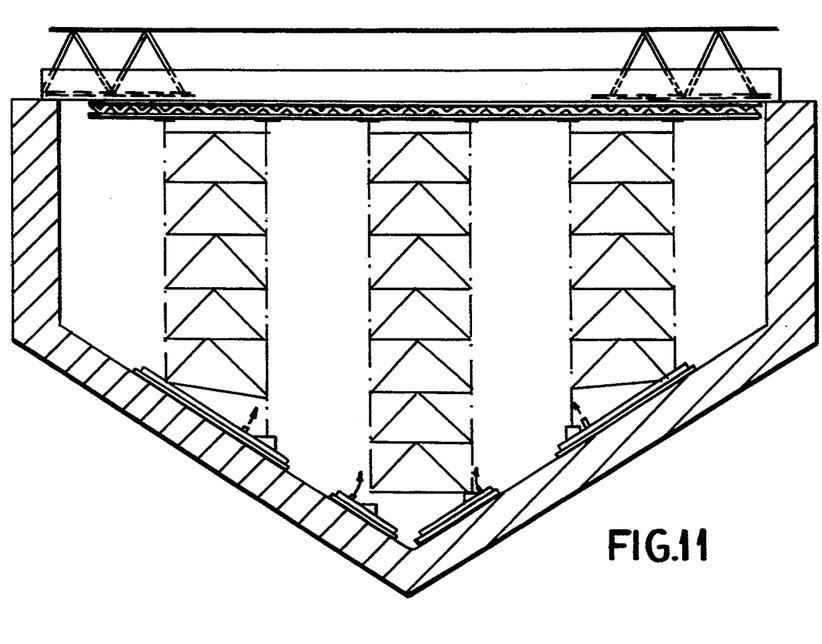
FIG. 11 is a diagrammatic view of the holding plate according to the invention mounted on an inclined storage surface (clarifying basin)

FIG. 11 shows how the invention can be applied in a clarifying basin which has inclined concrete walls, to which frame supports have to be affixed with the aid of the holding plate of the invention.

Figure 12:
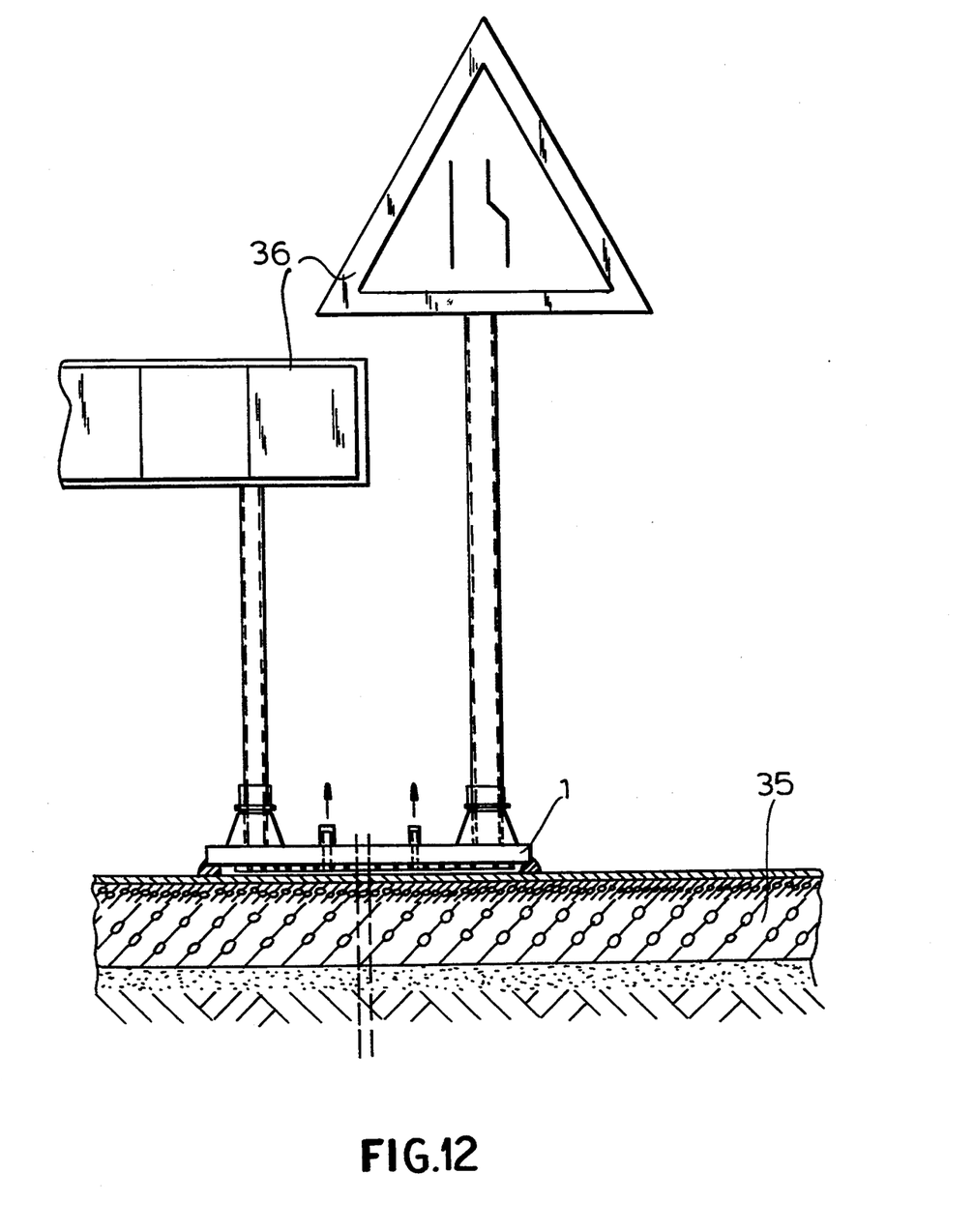
FIG. 12 is a diagrammatic view of the holding plate according to the invention used to hold traffic signs.

The embodiment example according to FIG. 12 illustrates the erection of traffic signs 36 which are supposed to be affixed to the asphalt so that they rest securely on their base. The holding plate 1 of the invention is again used in this instance in accordance with the representation in the drawing.

It has already been mentioned that the invention finds application possibilities in industry, trade or in private life. So for instance the vacuum holding plate of the invention can be used as a cable holding plate, shop accessories holding plate, as a holding plate for clothes, as a drilling devices holding plate, as a holding plate for diamond cutting, as a holding plate for light sources, as a holding plate for measuring instruments, a holding plate for filming and photo cameras, for shows and fairs, as advertisement displays for images, inscriptions or sensors, for antennas or receivers, as a holding plate for wall and ceiling recesses, for sealing against liquids, fresh concrete or fresh plaster.

Further utilizations would be holding plates for cantilever scaffolding, overhung constructions, for securing to facade walls for purposes of cleaning or inspecting parts of the facade wall, for roofing work, as a bannister post holder, holding plates on concrete supposed to be covered with wall hangings and where drilling is not allowed, as securing plates for cable attachment and further as securing plates in assembly operations.

What is claimed is:

1. A mounting assembly comprising:
   a planar and rigid plate having a sealing side to be affixed to an uneven fastening surface of a body;
   a laterally unconfined bead of a plastically deformable sealing mass applied to said sealing side, extending all along a periphery thereof, and projecting toward the body for providing an adhesion force between the plate and the body and adhesively engaging both the plate and the body, said bead, said sealing side and said fastening surface delimiting a chamber therebetween upon mounting of said plate on the body; and
   vacuum means including at least one vacuum passage traversing said plate and opening into said chamber for evacuating air from said chamber, said bead spreading against said surface and said plate upon evacuating air to seal said plate to the body.

2. The assembly defined in claim 1 wherein the sealing mass includes polyisobutylene.

3. The assembly defined in claim 1 wherein the planar and rigid plate is made of a corrosion-resistant plastic material with high surface adhesion, and comprised of polypropylene.

4. The assembly defined in claim 1 wherein the sealing side of the planar and rigid plate is provided with at least one longitudinally adjustable spacer pressing against said surface to maintain a predetermined vacuum volume in said chamber.

5. The assembly defined in claim 1 wherein said vacuum means further comprises at least one vacuum connection mounted laterally on said planar and rigid plate and with at least one suction opening, said suction opening communicating with the respective vacuum connection through the vacuum passage.

6. The assembly defined in claim 1 wherein the planar and rigid plate is formed with a rim having a shaped profile forming a guide for a guide element applying the sealing mass.

7. The assembly defined in claim 1 wherein a plurality of planar and rigid plates are sealed by respective beads of said mass and are connectable to respective separate vacuum pumps from which parallel vacuum lines lead to the individual planar and rigid plates.

8. The assembly defined in claim 1 wherein said sealing side of the plate has a roughened face.

9. The assembly defined in claim 1 wherein the planar and rigid plate has a size of approximately $30 \times 30$ cm$^2$ and a thickness of 3 to 5 cm.

10. The assembly defined in claim 1 wherein said vacuum means further includes a vacuum tank interposed between a vacuum pump and the vacuum passage traversing the planar and rigid plate.

11. The assembly defined in claim 10 wherein the vacuum tank has a cylindrical shape and is provided with at least one perforated dividing wall or with external peripheral ribs in order to preserve rigidity of said vacuum tank.

12. The assembly defined in claim 1 wherein a planar and plurality of rigid plates are sealed by respective beads of the plastically deformable sealing mass and said vacuum means is formed with either one pump common to said plurality of the plates.

13. The assembly defined in claim 1, further comprising a scaffolding console provided with said vacuum means mounted fixedly thereon and mounted on said planar and rigid plate.

14. The assembly defined in claim 1, further comprising an alarm system reacting to power failure for the vacuum means or to the reduction of vacuum below a certain threshold value.

15. A mounting assembly comprising:
   a planar and rigid plate having a sealing side to be affixed to an uneven fastening surface of a body;
   a peripherally closed bead of a plastically deformable sealing mass adhesively bonding to said side and said surface applied to said sealing side and projecting toward the body for providing an adhesion force between the plate and the body, said closed bead, sealing side and fastening surface delimiting a chamber therebetween upon attaching said plate to the body;
   vacuum means provided with at least one vacuum passage traversing said plate and opening into said chamber for generating a predetermined value of vacuum in said chamber thereby pressing said sealing mass against the fastening surface at a predetermined value of vacuum therein; and
   control means for controlling said predetermined value of vacuum in said chamber, providing thereby a reliable sealing of said planar and rigid plate to said fastening surface of the body.

16. The assembly defined in claim 15 wherein said control means includes an alarm system reacting to power failure for the vacuum means.

17. A mounting assembly comprising:
   an armature including a planar and rigid plate having a sealing side to be affixed to an uneven fastening surface of a body;
   a closed bead of a plastically deformable sealing mass applied to said sealing side and projecting toward the body for providing an adhesion force between the plate and the body, said closed bead, sealing side and fastening surface delimiting a chamber therebetween upon attaching said plate to the body;

vacuum means provided with at least one vacuum passage traversing said plate and opening into said chamber for generating a vacuum in said chamber thereby pressing said sealing mass against the fastening surface to seal off said chamber; and at least one longitudinally adjustable spacer formed with opposite ends thereof pressing against said fastening surface and said sealing side of said plate upon generating vacuum in said chamber.

* * * * *